US012603953B2

(12) United States Patent
  Nieri

(10) Patent No.:  US 12,603,953 B2
(45) Date of Patent:       Apr. 14, 2026

(54) VEHICULAR CONTROL SYSTEM THAT LIMITS DRIVER DISTRACTIONS WHILE THE VEHICLE IS MOVING

(71) Applicant: Magna Electronics Inc., Auburn Hills, MI (US)

(72) Inventor: John C. Nieri, Bruce Township, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 460 days.

(21) Appl. No.: 18/308,719

(22) Filed: Apr. 28, 2023

(65) Prior Publication Data

US 2023/0353670 A1      Nov. 2, 2023

Related U.S. Application Data

(60) Provisional application No. 63/363,812, filed on Apr. 29, 2022.

(51) Int. Cl.
  *H04M 1/72463*        (2021.01)
  *H04K 3/00*              (2006.01)

(52) U.S. Cl.
  CPC ...... *H04M 1/724634* (2022.02); *H04K 3/415* (2013.01)

(58) Field of Classification Search
  CPC .... B60W 50/16; B60W 30/165; B60W 40/04; B60W 40/09; B60W 40/105; B60W 40/107; B60W 2040/0818; B60W 2050/143; B60W 2050/146; B60W 2420/403; B60W 2540/229; B60W 2554/406; B60W 2554/802; B60W 2050/0064; B60W 2520/105; B60W 50/14; G06V 10/774; G06V 20/597; G06V 40/10; H04M 1/724634; H04M 1/724098; H04M 1/72463; H04K 3/415
  See application file for complete search history.

(56) References Cited

U.S. PATENT DOCUMENTS

| | | | |
|---|---|---|---|
| 5,550,677 | A | 8/1996 | Schofield et al. |
| 5,594,222 | A | 1/1997 | Caldwell |
| 5,670,935 | A | 9/1997 | Schofield et al. |
| 5,949,331 | A | 9/1999 | Schofield et al. |
| 6,001,486 | A | 12/1999 | Varaprasad et al. |
| 6,310,611 | B1 | 10/2001 | Caldwell |

(Continued)

*Primary Examiner* — Angelica Perez
(74) *Attorney, Agent, or Firm* — HONIGMAN LLP

(57) ABSTRACT

A vehicular control system includes an electronic control unit (ECU) disposed at a vehicle. The ECU includes electronic circuitry and associated software. The electronic circuitry of the ECU is operable to receive transmissions and to transmit signals. The vehicular control system, responsive to receiving at the ECU at least one transmission indicative of one or more mobile devices at an interior cabin of the vehicle, determines location of the one or more mobile devices at the interior cabin of the vehicle. Responsive to determination that a determined mobile device is located at a driver seat region of the interior cabin of the vehicle, and responsive to determination that the vehicle is moving at a speed above a threshold speed, the vehicular control system transmits a blocking signal to at least partially disable operation of the determined mobile device located at the driver seat region of the interior cabin.

25 Claims, 2 Drawing Sheets

(56) References Cited

U.S. PATENT DOCUMENTS

| | | | |
|---|---|---|---|
| 6,320,282 B1 | 11/2001 | Caldwell | |
| 6,627,918 B2 | 9/2003 | Getz et al. | |
| 7,038,577 B2 | 5/2006 | Pawlicki et al. | |
| 7,224,324 B2 | 5/2007 | Quist et al. | |
| 7,253,723 B2 | 8/2007 | Lindahl et al. | |
| 7,720,580 B2 | 5/2010 | Higgins-Luthman | |
| 7,855,755 B2 | 12/2010 | Weller et al. | |
| 9,405,120 B2 | 8/2016 | Graf et al. | |
| 9,688,199 B2 | 6/2017 | Koravadi | |
| 9,886,637 B1 | 2/2018 | Chan et al. | |
| 11,068,918 B2 | 7/2021 | Smid et al. | |
| 11,119,480 B2 | 9/2021 | Potnis et al. | |
| 11,488,399 B2 | 11/2022 | Wacquant | |
| 11,493,918 B2 | 11/2022 | Singh | |
| 2011/0039572 A1* | 2/2011 | Lamb | H04M 1/72463 |
| | | | 455/466 |
| 2011/0257846 A1 | 10/2011 | Bennett | |
| 2012/0046020 A1* | 2/2012 | Tomasini | H04M 1/72463 |
| | | | 455/418 |
| 2014/0022390 A1 | 1/2014 | Blank et al. | |
| 2014/0045477 A1* | 2/2014 | Ewell, Jr. | G06F 1/1694 |
| | | | 455/418 |
| 2014/0293169 A1 | 10/2014 | Uken et al. | |
| 2014/0336876 A1 | 11/2014 | Gieseke et al. | |
| 2014/0370869 A1* | 12/2014 | Naqvi | G06V 20/597 |
| | | | 455/418 |
| 2015/0009010 A1 | 1/2015 | Biemer | |
| 2015/0015710 A1 | 1/2015 | Tiryaki | |
| 2015/0022664 A1 | 1/2015 | Pflug et al. | |
| 2015/0092042 A1 | 4/2015 | Fursich | |
| 2015/0232030 A1 | 8/2015 | Bongwald | |
| 2015/0277735 A1 | 10/2015 | Gibson | |
| 2015/0294169 A1 | 10/2015 | Zhou et al. | |
| 2015/0296135 A1 | 10/2015 | Wacquant et al. | |
| 2015/0352953 A1 | 12/2015 | Koravadi | |
| 2016/0052391 A1 | 2/2016 | Walsh et al. | |
| 2016/0094707 A1* | 3/2016 | Stuntebeck | H04M 1/724631 |
| | | | 455/418 |
| 2016/0137126 A1 | 5/2016 | Fursich et al. | |
| 2016/0209647 A1 | 7/2016 | Fursich | |
| 2017/0097857 A1* | 4/2017 | Yang | G06F 11/3024 |
| 2017/0274906 A1 | 9/2017 | Hassan et al. | |
| 2018/0072321 A1* | 3/2018 | Mueller | B60W 50/16 |
| 2018/0107214 A1 | 4/2018 | Chandy | |
| 2018/0109412 A1* | 4/2018 | Xuan | H04L 41/22 |
| 2019/0049954 A1 | 2/2019 | Mitchell et al. | |
| 2019/0270459 A1* | 9/2019 | Williams | H04M 1/72454 |
| 2020/0146868 A1* | 5/2020 | Schweitzer | A61F 5/11 |
| 2021/0379990 A1* | 12/2021 | Tucci | B60K 28/063 |
| 2022/0194416 A1* | 6/2022 | Oniwa | B60K 35/28 |
| 2023/0271620 A1 | 8/2023 | Chan et al. | |

* cited by examiner

VEHICULAR CONTROL SYSTEM THAT LIMITS DRIVER DISTRACTIONS WHILE THE VEHICLE IS MOVING

CROSS REFERENCE TO RELATED APPLICATION

The present application claims the filing benefits of U.S. provisional application Ser. No. 63/363,812, filed Apr. 29, 2022, which is hereby incorporated herein by reference in its entirety.

FIELD OF THE INVENTION

The present invention relates generally to a vehicular control system for a vehicle.

BACKGROUND OF THE INVENTION

Use of mobile devices, such as cellphones, while driving a vehicle is a dangerous and distracting activity for the driver that is often the cause of automotive collisions. It is known to enable use of a mobile device through systems of the vehicle, such as a communications system that utilizes a microphone and speaker at the cabin of the vehicle, via wireless connection between the vehicle and the mobile device, such as via BLUETOOTH™ connectivity.

SUMMARY OF THE INVENTION

A vehicular control system includes an electronic control unit (ECU) disposed at a vehicle equipped with the vehicular control system. The ECU includes electronic circuitry and associated software. The electronic circuitry of the ECU may include a data processor for processing data (such as sensor data) received at the ECU and the ECU may include a communications module for receiving signals at the ECU and transmitting signals from the ECU. The control system, responsive to receiving a first signal at the ECU, determines presence of a mobile device (such as a cellphone) at an interior region of the vehicle. The control system, responsive to receiving a second signal at the ECU, determines that the vehicle is moving. For example, the system may receive a signal from a transmission controller of the vehicle indicating that a current gear or propulsion system of the vehicle is a drive or reverse gear or setting or may receive a signal from a wheel speed sensor indicating that the vehicle is moving above a threshold speed. Responsive to determining that the vehicle is moving, the control system transmits a blocking signal from the communications module to at least partially disable operation of the determined mobile device while the vehicle is moving.

These and other objects, advantages, purposes and features of the present invention will become apparent upon review of the following specification in conjunction with the drawings.

DESCRIPTION OF THE PREFERRED EMBODIMENTS

Figure 1:
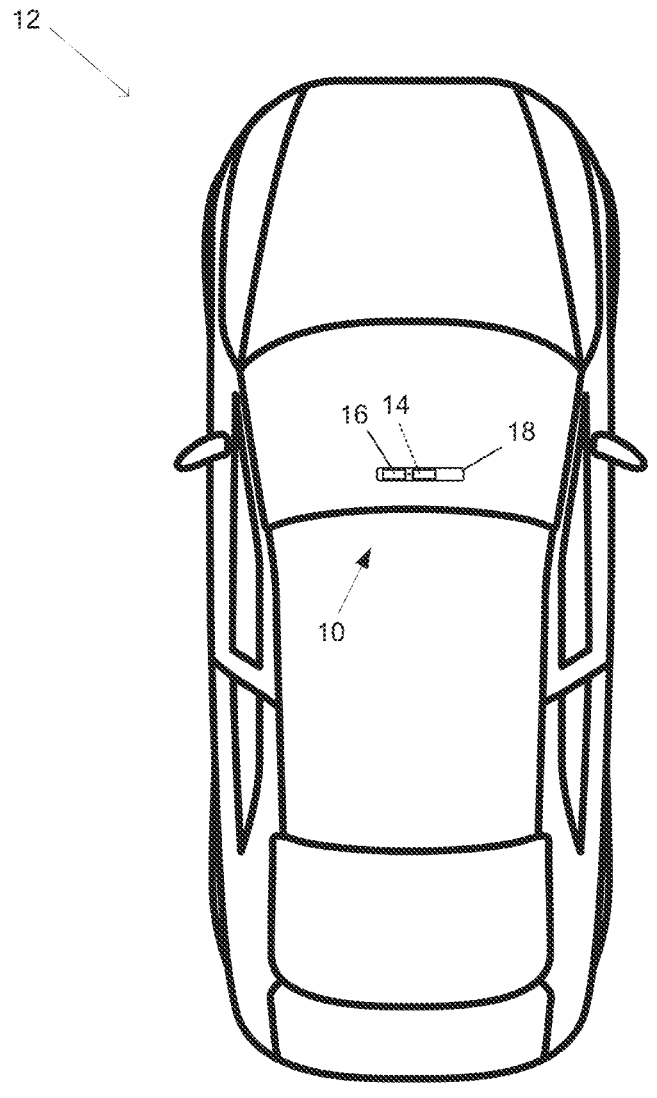
FIG. 1 is a plan view of a vehicle with a vehicular control system.

A vehicle control system or communications system 10 of a vehicle 12 operates to permit, limit or restrict, or entirely prevent use of mobile devices, such as cellphones, within the vehicle while the vehicle is moving to reduce distractions provided to a driver of the vehicle. For example, the driver and occupants of the vehicle may frequently carry mobile devices when driving or occupying a vehicle and may use these mobile devices for communication (e.g., phone calls and text messaging or use of social media), internet connectivity, music playback, GPS navigation, and the like. Use of mobile devices can enhance the driving experience and may provide safety features to the driver and occupants of the vehicle (such as hands free calling). Additionally, the driver and/or occupants of the vehicle may connect one or more mobile device to systems of the vehicle, such as via wireless connection, to enable the use of features of the mobile device with systems of the vehicle while driving. For example, a mobile device may be connected to a vehicle and make use of a microphone and speaker of the vehicle to perform hands free phone calls. Additionally, a display screen of the vehicle may display information or images from the mobile device to the driver of the vehicle, such as to provide GPS information for viewing by the driver. However, use of mobile devices also may lead to distracted driving as the driver of the vehicle may use the mobile device in a way that, for example, requires the driver to avert his or her gaze from the road or take his or her hands off the steering wheel.

Referring now to the drawings and the illustrative embodiments depicted therein, the vehicular control system 10 at the vehicle 12 may include an electronic control unit (ECU) 14 including electronic circuitry and associated software. The electronic circuitry of the ECU 14 may include a data processor for processing sensor data captured by one or more sensors for one or more systems of the vehicle (such as image data captured by one or more cameras disposed at the vehicle for an advanced driver assist system (ADAS) or driver monitoring system of the vehicle). The system also includes a communications module 16, which may be part of the electronic circuitry of the ECU 14, configured to receive signals and transmit signals from the system, such as wirelessly within the vehicle to one or more mobile devices within the vehicle. The communications module 16 may include a transmitting and receiving antenna configured for short range wireless communications between the ECU 14 and one or more mobile devices within the vehicle. The ECU 14 and communication module 16 may be disposed at any suitable position or location within the vehicle, such as at a central ECU of the vehicle or at a windshield mounted electronics module 18 that may house one or more sensors (such as a radar sensor or camera or the like) and ECU for operating an ADAS of the vehicle. Positioning at least the communications module 16 at the interior region of the vehicle may provide improved connectivity between the communications module 16 and any mobile devices within the vehicle. The vehicle control system 10 operates to control (e.g., permit, limit, or prevent) the use of mobile devices, such as cellphones, within the vehicle 12 by communicating a signal to one or more mobile devices located within the vehicle where the signal at least partially disables operation of the mobile device while the vehicle is moving. Data transfer or signal communication between the ECU and the communications module (and any camera or sensor at the vehicle) may comprise any suitable data or communication link, such as a vehicle network bus or the like of the equipped vehicle.

Figure 2:
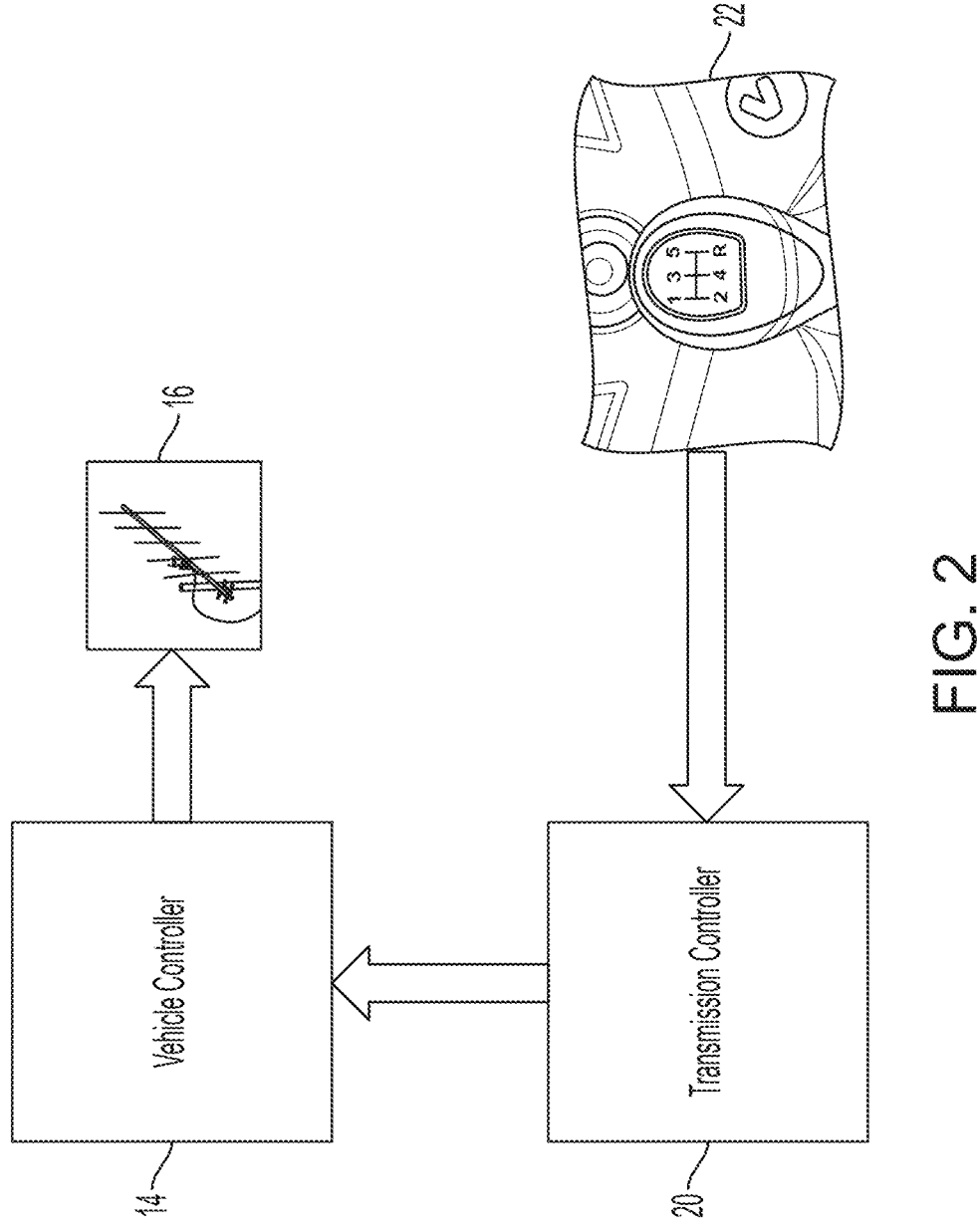
FIG. 2 is a schematic view of the vehicular control system in communication with a transmission controller of the vehicle.

As shown in FIG. 2, the system may communicate with a transmission controller 20 of the vehicle to determine when the vehicle is moving so as to only disable mobile device operation when the vehicle is moving. That is, the system may permit mobile device operation when the vehicle is stationary and disable mobile device operation while the vehicle is in motion. For example, the transmission controller 20 may communicate a signal to the ECU 14 indicating that a gear selector 22 of the vehicle has chosen a drive or reverse gear or propulsion setting (and thus the vehicle is moving forward or in reverse) and/or a wheel speed sensor may generate an output indicative of speed of the vehicle, and the system may limit use of the determined cell phone when the vehicle is determined to be traveling at a speed greater than a threshold speed (e.g., greater than 5 mph, greater than 10 mph, greater than 25 mph, greater than 35 mph, greater than 55 mph and the like). Optionally, to disable operation of the mobile device when the vehicle is in motion, the threshold speed may be set to 0 mph. The system may, for example, provide disabling of operation of the mobile device when the vehicle moves forward at greater than a forward threshold speed, and when the vehicle moves at any speed in reverse.

Optionally, the system 10 may determine that the vehicle 12 is moving based on a signal received from another system of the vehicle or based on processing of sensor data at the ECU. For example, the system 10 may receive a signal from a navigation system of the vehicle indicating that the vehicle is in motion or the system may, based on processing of image data captured by one or more cameras disposed at the vehicle, determine that the vehicle is in motion.

Responsive to determining that the vehicle is moving (such as moving at a speed greater than a threshold speed), the system transmits a blocking signal from the communications module 16 to at least partially disable operation of one or more mobile devices in the vehicle. For example, the blocking signal may selectively disable operations of the mobile device that would be considered distracting for the driver of the vehicle, such as text messaging, while permitting or not disabling operations of the mobile device considered permissible or not as distracting for the driver, such as making phone calls.

The blocking signal may include a communication jamming signal that interferes with or prevents the mobile device from sending or receiving signals while the vehicle is moving. That is, the communications module may comprise a jamming device configured to jam cellphone usage by transmitting signals on the same frequency and at high enough power to cancel signals being received by and transmitted from cellphones within the vehicle while the vehicle is moving.

Optionally, the blocking signal may comprise a signal communicated from the communications module to an operations or control system of the mobile device, and the operations system of the mobile device, responsive to the blocking signal, may at least partially disable the operation of the mobile device. For example, the blocking signal may include a request for the operations system of the mobile device to restrict use of text messaging applications on the mobile device and the operations system may disable such applications (and/or additional applications or features) responsive to receiving the request. Optionally, the blocking signal may result in the display screen or touchscreen of the mobile device being rendered inoperative while the vehicle is moving (i.e., the driver cannot view or use the display screen of the mobile device while the vehicle is moving). A display screen in the vehicle may be operable to display the screen images of the mobile device and/or an audio system of the vehicle may read messages to the driver, but use of the display screen of the mobile device is restricted or precluded.

Thus, the system 10 may be in wireless communication with one or more mobile devices located within the vehicle, such as via BLUETOOTH™ connectivity between the system and mobile device. The system 10 may determine presence of the one or more mobile devices within the vehicle based on a signal received at the ECU, such as a signal from the mobile device and/or a signal from a system of the vehicle confirming connection to the mobile device. When more than one mobile device is present in the vehicle, such as when the driver and at least one occupant each have a mobile device, the system may selectively communicate the blocking signal to only the driver's mobile device (based on determination of location of that mobile device at or near the driver's seating area or region of the vehicle) so that the occupant may be free to use their mobile device while the vehicle is moving. In other words, the system may disable operations of the driver's mobile device while not disabling operations of the occupant's mobile device.

For example, the system may determine presence of the one or more mobile devices in the vehicle and may determine positions or locations of the mobile devices within the vehicle, such as based on relative signal strength from the mobile device, placement of the mobile device on a wireless charging pad, wired connection (e.g., USB) of the mobile device to the vehicle, or other suitable means. The system may disable operations of the mobile devices based on the determined location of each mobile device in the vehicle, such as based on a proximity of the determined location relative to a driver seat, so that mobile devices are only disabled if they are in a position or location that could potentially distract the driver.

Optionally, the system may determine presence of the one or more mobile devices in the vehicle and may determine a user profile attributable to the mobile devices, and selectively transmit the blocking signal to a mobile device based on the determined user of the mobile device. For example, the system may store user profiles for one or more drivers of the vehicle, such as to store user preferences like seat positioning and display and climate settings, and may identify a current driver of the vehicle based on, for instance, a user profile corresponding to a key fob present in the vehicle. The system may determine whether a mobile device present in the vehicle corresponds to the current driver of the vehicle based on, for example, the stored user profile of the current driver and a signal from the mobile device indicative of the user of the mobile device. Thus, the system may transmit the blocking signal to or otherwise limit use of a mobile device attributable to the driver of the vehicle and not transmit the blocking signal to or otherwise limit use of any other mobile devices not attributable to the driver of the vehicle. Further, the system may limit usage of the mobile devices attributed to some driver profiles while allowing usage of the mobile devices attributed to other driver profiles, and the treatment of different profiles may be configurable by a user. For example, a parent may configure the system to prohibit usage of mobile devices attributed to driver profiles corresponding to their children while configuring the system to allow usage of mobile devices attributed to the driver profile corresponding to the parent.

Optionally, the blocking signal may be configured to disable different operations of the mobile device based on connection of the mobile device to a communications system of the vehicle. For example, a vehicle may be equipped with a communications system that enables hands free use of mobile devices via a microphone, speaker, and display screen of the vehicle. Thus, the driver of the vehicle may be able to use features of the mobile device via the systems of the vehicle in a more safe manner than if using the mobile device directly. Here, the system may determine presence of the mobile device in the vehicle and may determine whether the mobile device is connected to the communications system of the vehicle and the system may only permit operation of the mobile device (i.e., the system will not transmit the blocking signal) responsive to a determination that the mobile device is connected and being used via the communications system. For example, the system may disable operation of the mobile device responsive to determining that the mobile device is being used directly (e.g., a touchscreen of the device is being used) rather than being used through the communications system of the vehicle, or the system may only permit operation of the mobile device once the mobile device is connected to the communications system of the vehicle.

Optionally, the system may disable operations of the mobile device based on a condition of the vehicle so that, if driving conditions are more hazardous, the system may decrease the range of operations of the mobile device to further reduce distractions. For example, the system may, in clear or ideal driving conditions (e.g., low traffic volume, warm and/or sunny weather, highway driving and the like), allow phone calls from the mobile device, but, when the vehicle is travelling in poor driving conditions (e.g., heavy traffic volume, cold weather, at night, during heavy rain and the like), phone calls may be disabled.

Optionally, the system may increase or decrease the range of disabled operations based on a condition. For example, phone calls may be permitted when the vehicle is travelling below a threshold speed and disabled when travelling above the threshold speed, while text messaging or other operations may not be permitted at any speed (or only permitted at a lower threshold speed). In another example, the system may receive traffic information from a GPS system of the vehicle and may adjust the range of disabled operations based on a level of traffic around the vehicle. In yet another example, the system may receive signals from an ADAS of the vehicle and may adjust the range of disabled operations based on a level of autonomous control of the vehicle.

Optionally, the system may limit operation of the mobile device based on a geographic location of the vehicle, which may be determined via GPS information. For example, some jurisdictions or regions may allow use of the mobile device while driving while other jurisdictions or regions may prohibit use of the mobile device except for hands free calling. The system may store information indicating which uses of the mobile device are permitted or prohibited based on geographic location of the vehicle, or the system may communicate with an external server for determining which functions of the mobile device to block based on the geographic location of the vehicle.

Optionally, while the system is prohibiting one or more functions of the mobile device (such as prohibiting internet access of the mobile device), the system may receive an override request signal and, in response to the override request signal, the system may allow the one or more functions of the mobile device (e.g., the system may cease blocking the one or more functions). For example, the user may provide the override request to disable the blocking of mobile device usage via an input at the mobile device or via an input at the interior portion of the vehicle (such as at the infotainment screen of the vehicle). Thus, the user may selectively disable operation of the system blocking usage of one or more mobile devices in the vehicle. That is, the system may be disabled for some mobile devices in the vehicle (e.g., mobile devices associated with passengers) while the system may remain active for other mobile devices in the vehicle (e.g., mobile devices associated with the driver).

The system may communicate with one or more other systems of the vehicle or sensors of the vehicle for receiving signals indicating the condition of the vehicle or sensor data representative of the environment about the vehicle. For example, the system may receive sensor data from a rain sensor at the vehicle for determining whether the vehicle is experiencing rain or the system may receive signals from an ADAS of the vehicle indicating that the vehicle is being autonomously controlled.

Thus, the vehicular control system provides a safety feature to prevent handheld cellphone operation while the vehicle is moving. Specifically, the system prevents the driver from using handheld cellphones and mobile devices while driving. When placing the vehicle in a drive or reverse gear or propulsion setting, a signal may be sent within the vehicle compartment to block cellphone usage. The driver will be unable to send or receive messages or text on handheld cellphones and mobile devices. A vehicle communication system may be used for incoming or outgoing calls. The system may be added as a vehicle feature, which may interact with a transmission controller and vehicle controller of the vehicle. The feature will emit cellphone jamming signals when placing the vehicle in a drive or reverse gear or propulsion setting. The system may decrease automotive accidents as a result of drivers using cellphones and texting while driving, decreasing driver distractions and improving driving safety. This is a preventative safety measure for the driver. The system may determine (either by location or name or other identification) when a driver's cellphone is being used (as opposed to an occupant's cellphone) and can limit only the driver's phone. The vehicle system may communicate with the phone to shut down texting or touch screen functions of the driver's phone.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the control system and/or processing and/or camera and/or circuitry may utilize aspects described in U.S. Pat. Nos. 9,233,641; 9,146,898; 9,174,574; 9,090,234;

9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or a 4G or 5G broadband cellular network) technology provides for communication between vehicles and/or infrastructure based on information provided by one or more vehicles and/or information provided by a remote server or the like. Such vehicle communication systems may utilize aspects of the systems described in U.S. Pat. Nos. 10,819,943; 9,555,736; 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:

an electronic control unit (ECU) disposed at a vehicle equipped with the vehicular control system, wherein the ECU comprises electronic circuitry and associated software;

wherein the electronic circuitry of the ECU is operable to receive transmissions and to transmit signals;

wherein the vehicular control system, responsive to receiving at the ECU at least one transmission indicative of one or more mobile devices at an interior cabin of the vehicle, determines location of the one or more mobile devices at the interior cabin of the vehicle;

wherein, responsive to determination that a determined mobile device is located at a driver seat region of the interior cabin of the vehicle, and responsive to determination that the vehicle is moving at a speed above a threshold speed, the vehicular control system transmits a blocking signal to at least partially disable operation of the determined mobile device located at the driver seat region of the interior cabin of the vehicle;

wherein, responsive to receiving the blocking signal from the vehicular control system at the determined mobile device, the determined mobile device is (i) operable to perform telephone calls and (ii) inoperable to send text messages; and wherein, based at least in part on the transmitted blocking signal, and with the determined mobile device inoperable to send text messages, the vehicular control system is operable to communicate text messages received by the determined mobile device to an occupant of the vehicle via at least one selected from the group consisting of (i) a display screen of the vehicle and (ii) an audio system of the vehicle.

2. The vehicular control system of claim 1, wherein the transmitted blocking signal comprises a jamming signal that prevents the determined mobile device located at the driver seat region of the interior cabin of the vehicle from sending or receiving signals.

3. The vehicular control system of claim 1, wherein the transmitted blocking signal comprises a request, and wherein, responsive to receiving the request at the determined mobile device, operation of the determined mobile device is at least partially disabled.

4. The vehicular control system of claim 1, wherein, responsive to determining location of a first mobile device at the driver seat region of the interior cabin of the vehicle and determining location of a second mobile device at another region of the interior cabin of the vehicle remote from the driver seat region, the vehicular control system transmits the blocking signal that at least partially disables operation of the determined first mobile device and that does not disable operation of the determined second mobile device.

5. The vehicular control system of claim 1, wherein, responsive to determination that the determined mobile device is not located at the driver seat region of the interior cabin of the vehicle, the vehicular control system does not transmit the blocking signal.

6. The vehicular control system of claim 1, wherein the transmitted blocking signal disables operation of a display screen of the determined mobile device.

7. The vehicular control system of claim 1, wherein the vehicular control system, responsive to a current propulsion setting of the vehicle being in a forward setting or a reverse setting, determines that the vehicle is moving at the speed above the threshold speed.

8. The vehicular control system of claim 7, wherein the threshold speed is at least five miles per hour when the current propulsion setting is in the forward setting, and wherein the threshold speed is zero miles per hour when the current propulsion setting is in the reverse setting.

9. The vehicular control system of claim 1, wherein the vehicular control system determines that the vehicle is moving at the speed above the threshold speed based on a signal received from a GPS of the vehicle.

10. The vehicular control system of claim 1, wherein the vehicular control system determines that the vehicle is moving at the speed above the threshold speed based on a signal received from a speedometer of the vehicle.

11. The vehicular control system of claim 1, wherein the determined mobile device comprises a cellphone.

12. A vehicular control system, the vehicular control system comprising:

an electronic control unit (ECU) disposed at a vehicle equipped with the vehicular control system, wherein the ECU comprises electronic circuitry and associated software;

wherein the electronic circuitry of the ECU is operable to receive transmissions and to transmit signals;

wherein the vehicular control system, responsive to receiving at the ECU at least one transmission indicative of one or more mobile devices at an interior cabin of the vehicle, determines location of the one or more mobile devices at the interior cabin of the vehicle;

wherein, responsive to determination that a determined mobile device is located at a driver seat region of the interior cabin of the vehicle, and responsive to determination that the vehicle is moving at a speed above a threshold speed, the vehicular control system transmits a blocking signal to at least partially disable operation of the determined mobile device located at the driver seat region of the interior cabin of the vehicle;

wherein the transmitted blocking signal comprises a request, and wherein, responsive to receiving the request at the determined mobile device, operation of the determined mobile device is at least partially disabled;

wherein the transmitted blocking signal permits the determined mobile device located at the driver seat region of the interior cabin of the vehicle to perform telephone calls and disables the determined mobile device located at the driver seat region of the interior cabin of the vehicle from sending text messages; and wherein, based at least in part on the transmitted blocking signal, and with the determined mobile device inoperable to send text messages, the vehicular control system is operable to communicate text messages received by the determined mobile device to an occupant of the vehicle via at least one selected from the group consisting of (i) a display screen of the vehicle and (ii) an audio system of the vehicle.

13. The vehicular control system of claim 12, wherein, responsive to determining location of a first mobile device at the driver seat region of the interior cabin of the vehicle and determining location of a second mobile device at another region of the interior cabin of the vehicle remote from the driver seat region, the vehicular control system transmits the blocking signal that at least partially disables operation of the determined first mobile device and that does not disable operation of the determined second mobile device.

14. The vehicular control system of claim 12, wherein, responsive to determination that the determined mobile device is not located at the driver seat region of the interior cabin of the vehicle, the vehicular control system does not transmit the blocking signal.

15. The vehicular control system of claim 12, wherein the transmitted blocking signal disables operation of a display screen of the determined mobile device.

16. The vehicular control system of claim 12, wherein the vehicular control system, responsive to a current propulsion setting of the vehicle being in a forward setting or a reverse setting, determines that the vehicle is moving at the speed above the threshold speed.

17. The vehicular control system of claim 16, wherein the threshold speed is at least five miles per hour when the current propulsion setting is in the forward setting, and wherein the threshold speed is zero miles per hour when the current propulsion setting is in the reverse setting.

18. The vehicular control system of claim 12, wherein the vehicular control system determines that the vehicle is moving at the speed above the threshold speed based on a signal received from a GPS of the vehicle.

19. The vehicular control system of claim 12, wherein the vehicular control system determines that the vehicle is moving at the speed above the threshold speed based on a signal received from a speedometer of the vehicle.

20. A vehicular control system, the vehicular control system comprising:

an electronic control unit (ECU) disposed at a vehicle equipped with the vehicular control system, wherein the ECU comprises electronic circuitry and associated software;

wherein the electronic circuitry of the ECU is operable to receive transmissions and to transmit signals;

wherein the vehicular control system, responsive to receiving at the ECU transmissions indicative of mobile devices at an interior cabin of the vehicle, determines location of one or more of the mobile devices at the interior cabin of the vehicle;

wherein the vehicular control system, responsive to receiving the transmissions, determines location of a first mobile device at the interior cabin of the vehicle and determines location of a second mobile device at the interior cabin of the vehicle;

wherein, responsive to determination that the first mobile device is located at a driver seat region of the interior cabin of the vehicle, and responsive to determination that the vehicle is moving at a speed above a threshold speed, the vehicular control system transmits a blocking signal to at least partially disable operation of the determined first mobile device located at the driver seat region of the interior cabin of the vehicle;

wherein the transmitted blocking signal at least partially disables operation of the determined first mobile device and does not disable operation of the determined second mobile device;

wherein, responsive to receiving the blocking signal from the vehicular control system at the determined first mobile device, the determined first mobile device is (i) operable to perform telephone calls and (ii) inoperable to send text messages;

wherein, based at least in part on the transmitted blocking signal, and with the determined first mobile device inoperable to send text messages, the vehicular control system is operable to communicate text messages received by the determined first mobile device to an occupant of the vehicle via at least one selected from the group consisting of (i) a display screen of the vehicle and (ii) an audio system of the vehicle; and wherein the vehicular control system determines that the vehicle is moving at the speed above the threshold speed based at least in part on at least one selected from the group consisting of (i) a signal received from a speedometer of the vehicle and (ii) a signal received from a GPS of the vehicle.

21. The vehicular control system of claim 20, wherein the transmitted blocking signal comprises a jamming signal that prevents the determined first mobile device located at the driver seat region of the interior cabin of the vehicle from sending or receiving signals.

22. The vehicular control system of claim 20, wherein the transmitted blocking signal comprises a request, and wherein, responsive to receiving the request at the determined first mobile device, operation of the determined first mobile device is at least partially disabled.

23. The vehicular control system of claim 20, wherein the transmitted blocking signal disables operation of a display screen of the determined first mobile device.

24. The vehicular control system of claim 20, wherein the vehicular control system, responsive to a current propulsion setting of the vehicle being in a forward setting or a reverse setting, determines that the vehicle is moving at the speed above the threshold speed.

25. The vehicular control system of claim 24, wherein the threshold speed is at least five miles per hour when the current propulsion setting is in the forward setting, and wherein the threshold speed is zero miles per hour when the current propulsion setting is in the reverse setting.

* * * * *